United States Patent [19]

Roesler et al.

[11] Patent Number: 5,290,476
[45] Date of Patent: Mar. 1, 1994

[54] PROCESS FOR PREPARING MICROCRYSTALLINE PERBORATE PRODUCTS

[75] Inventors: Richard Roesler, Rheinbrohl; Werner Doetsch, Bad Hoenningen; Werner Zeiss, Groebenzell; Rudolf Siegel, Neuwied, all of Fed. Rep. of Germany

[73] Assignee: Peroxid-Chemie GmbH, Hoellriegelskreuth, Fed. Rep. of Germany

[21] Appl. No.: 709,307

[22] Filed: Jun. 3, 1991

[30] Foreign Application Priority Data

Jun. 6, 1990 [DE] Fed. Rep. of Germany ....... 4018039

[51] Int. Cl.$^5$ .............................................. C11D 3/39
[52] U.S. Cl. ............................. 252/186.3; 252/186.28; 23/302 T; 423/281
[58] Field of Search ............... 252/186.3, 186.28; 23/302 T; 423/281

[56] References Cited

U.S. PATENT DOCUMENTS 2,380,779  7/1945  Nees ........................................ 23/60
3,553,140  1/1971  Lindner et al. .................. 252/186.3

FOREIGN PATENT DOCUMENTS 294904  12/1988  European Pat. Off. .

OTHER PUBLICATIONS

Cotton et al. *Advanced Inorganic Chemistry* "A Comprehensive Text", John Wiley and Sons, 1980, p. 299.

Primary Examiner—Robert L. Stoll
Assistant Examiner—Valerie Fee
Attorney, Agent, or Firm—Evenson, McKeown, Edwards & Lenahan

[57] ABSTRACT

A process for preparing microcrystalline perborate hydrate products and highly concentrated, storage stable aqueous solutions used for this purpose which have a stable active oxygen content and a boron content of 3 to 8% by wt. based on the total weight of the solution. The products of the invention are suitable for numerous uses in the field of bleaching agent, disinfectant and liquid detergent formulations, and other fields of use.

40 Claims, No Drawings

PROCESS FOR PREPARING MICROCRYSTALLINE PERBORATE PRODUCTS

BACKGROUND OF THE INVENTION

This invention relates to on a process for preparing microcrystalline perborate products and highly concentrated, storage stable aqueous solutions which are used for said preparation in one variant of the process and which contain a boron-oxygen compound, hydrogen peroxide, and sodium hydroxide in a special composition.

In the production of liquid bleach, disinfectant and liquid detergent formulations, including liquid aqueous detergent formulations, producers wish to incorporate compounds having a bleaching activity such as perborates (e.g. sodium perborate tetrahydrate=PBS4) in the liquid formulations. The perborates exist as suspended particles in these formulations and therefore must not exceed a certain particle size for reasons relating to the physical stability of the suspension. Therefore, attempts are made to incorporate the perborates (e.g. PBS4) in the formulations in a form which is as finely divided as possible, i.e. in the form of microparticles having a particle diameter not greater than 20 micrometers, preferably with a particle diameter of less than 5 micrometers.

According to the processes of the prior art, it is difficult to prepare sufficiently fine perborate particles which are highly suitable e.g. for forming a suspension in liquid detergent formulations. In order to ensure the physical stability of the suspension of perborate particles in liquid detergent formulations, thickeners and dispersing aids must be used in the prior art. It is however, disadvantageous that, as a result of this measure, the proportion of active ingredients in the liquid detergent formulation is decreased by the proportion of thickeners and dispersing agents.

Aqueous liquid detergent formulations containing sodium perborate tetrahydrate in the form of fine crystals, and processes for forming the perborate in the form of fine crystals in such formulations are already known from European patent application No. EP 294,904. An "in situ crystallization" of PBS4 is described, i.e. the crystallization of PBS4, optionally after in situ formation from metaborate and $H_2O_2$ in the presence of at least 5% by wt. surfactant and at least 5% by wt. builder. Moreover, liquid aqueous washing agent formulations are claimed which contain PBS4 "crystallized in situ" having particle diameters m of 0.5 to 20 micrometers. According to the examples, the particle sizes obtained at the lower end of the range average from 4 to 7 micrometers.

The above-mentioned European patent application discloses two process variants for preparing these washing agent formulations which contain PBS4 "crystallized situ". The first process variant is a dissolution/recrystallization process in which the perborate particles are formed by intensively stirring a perborate composed of relatively large crystals in the presence of the surfactant and builder. PBS4 particles having an average particle diameter of approximately 7 micrometers are obtained. The second process variant is a process in which the perborate is formed in situ by chemical reaction of metaborate (Na:B=1:1) with hydrogen peroxide in the presence of at least 5% by wt. surfactant and at least 5% by wt. builder and crystallized out. In this process, either metaborate is used as the boron component, or it is also possible to use borax or boric acid. In this case, however, metaborate is formed initially due to the stoichiometric addition of NaOH, and the metaborate is subsequently converted by the addition of $H_2O_2$ in the presence of surfactant and builder to the perborate which crystallizes out. PBS4 particles having an average particle diameter of approximately 4 micrometers are obtained.

The prior art processes have a number of disadvantages. The limited solubility of metaborate permits only moderate concentrations of dissolved boron components (approximately 20% by wt. metaborate in water at 20° C.). Moreover, the only moderately concentrated metaborate solutions tend to crystallize prematurely.

In the process of European patent application no. EP 294 904, the presence of surfactant and builder is essential to obtain small particle diameters, but on the other hand, it can lead to undesired secondary reactions during the reaction with $H_2O_2$. Moreover, there are problems with "in situ crystallization" with regard to control and reproducibility of the required small particle diameters.

SUMMARY OF THE INVENTION

It is the object of the invention to provide a process for preparing microcrystalline perborate products which overcomes the disadvantages of the prior art processes.

Another object of the invention is to provide a technically simple process for preparing microcrystalline perborate products, particularly for liquid detergent formulations.

It is also an object of the invention to provide a process for preparing microcrystalline perborate products, which makes it possible to obtain high concentrations of dissolved boron in the aqueous medium .while avoiding premature crystallization of solid perborates.

An additional object of the invention is to provide a process for preparing microcrystalline perborate products which avoids unwanted secondary reactions between hydrogen peroxide and organic components (e.g. surfactants) of aqueous liquid detergents.

Yet another object of the invention is to provide a process for preparing microcrystalline perborate products which can be carried out without adding surfactant and/or builder.

A still further object of the invention is to provide a process for preparing microcrystalline perborate products which yields microcrystalline perborate products, especially microcrystalline sodium perborate tetrahydrate products, with a high degree of reproducibility.

These and other objects are achieved by providing a process for preparing microcrystalline perborate products, comprising the steps of: a) reacting a liquid aqueous composition A, which contains a boron-oxygen compound, hydrogen peroxide and a quantity of an alkali metal hydroxide such that the molar ratio of alkali metal to boron is at most 0.75:1, with a basic inorganic alkali metal compound to form a solution B, wherein the basic inorganic alkali metal compound and composition A are used in such quantities that the molar ratio of alkali metal to boron in solution B is at least 0.80:1 and the boron concentration in solution B is 1 to 4.5% by wt. based on the weight of the solution, and b) cooling the resulting solution B and crystallizing a perborate product.

According to a further aspect of the invention, the objects are achieved by providing a storage stable, concentrated aqueous perborate solution containing quantities of boron-oxygen compound, hydrogen peroxide and sodium hydroxide such that the boron content of said solution is 3 to 8% by wt. based on the total weight of the solution, the molar ratio of sodium to boron is from 0.55:1 to 0.70:1, and the molar ratio of active oxygen to boron is at least 0.9:1.

DETAILED DESCRIPTION OF PREFERRED EMBODIMENTS

The invention provides a process for preparing microcrystalline perborate products in which (a) a liquid aqueous composition A, which contains a boronoxygen compound dissolved and/or in suspension in water, hydrogen peroxide and a quantity of an alkali metal hydroxide such that the molar ratio of alkali metal originating from the alkali metal hydroxide and possibly the boron-oxygen compound to boron is at most 0.75:1, is reacted with a basic inorganic alkali metal compound in solid form or in the form of aqueous solutions to form a solution B, the alkali metal compound and the composition A being used in quantities such that, in the solution B, the molar ratio of alkali metal to boron is at least 0.80:1 and the boron concentration is 1 to 4.5% by wt., based on the aqueous solution B, and (b) the perborate product is crystallized by cooling the resulting solution B.

The microcrystalline perborate products prepared according to the process of the invention are characterized by their physical nature and by their chemical composition. They are, for example, aqueous suspensions or pastes of microcrystalline perborates which are obtained as direct products of the process of the invention. These products can be incorporated directly in the desired quantity into a liquid aqueous bleaching, disinfectant or detergent formulation, etc. Alternatively, if desired, the products may first be subjected to other treatments; for example, alcohols can be added to depress the solubility equilibrium or to suppress re-dissolution and recrystallization processes. For non-aqueous applications, the suspensions or pastes of microcrystalline perborate can also be subjected to a solvent exchange, e.g. for preparing non-aqueous suspensions or pastes, or converted to an anhydrous, dry, solid microcrystalline perborate product.

In terms of their chemical nature, the microcrystalline perborate products prepared according to the invention are pure or mixed alkali metal perborates. These Perborates are present in the form of a hydrate, preferably a tetrahydrate.

Perborate particles having, overall particle diameters of less than 20 micrometers are considered microcrystalline perborate particles. Advantageously, the microcrystalline perborate particles obtained by the process of the invention have a particle diameter of not more than 10 micrometers. However, in preferred embodiments of the process of to the invention, the microcrystalline perborate particles which are obtained have particle diameters of not more than 5 micrometers, particularly preferably not more than 3 micrometers.

In theory, any boron-oxygen compounds, even those that already contain an alkali metal, or mixtures thereof, can be used for preparing the composition A for process stage a). Examples of suitable boron-oxygen compound starting materials include boric acid, boron oxide ($B_2O_3$), borax (e.g. borax decahydrate or borax pentahydrate), metaborate, boron minerals, etc. Hydrogen peroxide as such, e.g. as a 30 to 85% by wt. aqueous solution, or also hydrogen peroxide formed in situ from alkali peroxides can be used as starting materials for the hydrogen peroxide contained in composition A. Basic inorganic alkali metal compounds such as alkali hydroxides or oxides can be used as a source of alkali metal. If desired these basic alkali metal source compounds may be supplemented by other sources. The foregoing list of starting materials are is given only by way of example and is not limiting. It is, for example, also possible to use orthoborate solutions, but in this case e.g. boric acid or boron oxide and possibly in addition an inorganic acid (e.g. sulfuric acid or phosphoric acid) must be added in order to adjust the molar ratio of alkali metal cation to boron. Moreover, it should be pointed out that if composition A in process stage a) contains a boron-oxygen compound, hydrogen peroxide and an alkali metal hydroxide, this does not necessarily mean that the starting materials mentioned are present only as such in composition A. On the contrary, reaction products which form when the starting materials are added also are present.

The alkali metals which may be present in composition A are lithium, sodium and potassium, but preferably sodium. It is also possible to start from alkali metal-free compositions A (e.g. with boric acid and hydrogen peroxide as starting materials) in the process according to the invention, but it has proved to be more advantageous if an composition A already contains alkali metal.

Composition A is reacted with a basic inorganic alkali metal compound which may be present in solid form or in the form of an aqueous solution. Basic inorganic compounds, e.g. hydroxides, oxides and also carbonates of the alkali metals lithium, sodium and potassium, are suitable for this purpose. Sodium hydroxide is particularly preferred.

According to the process of the invention, the liquid aqueous composition A is reacted with one of the above mentioned basic inorganic alkali metal compounds present in solid form or in the form of aqueous solutions to form a clear solution. The reaction can take place either without any heating or without substantial heating, with pronounced autoheating, or heat can also be introduced from outside, if desired, e.g. in order to increase the temperature of solution B, for example to approximately 60° C. As a result of the reaction, the molar ratio of alkali metal cation to boron (<0.75:1) is shifted from a region with high solubility for the components present in composition A, or such a region of high solubility is at least passed through intermediately during the reaction, to a region with low solubility for the perborate product (ratio of alkali metal to boron >0.80:1). The range of the molar ratio of alkali metal to boron from >0.75:1 to <0.80:1 is critical because pronounced sudden solubility property changes occur in this range.

According to the process of the invention, the microcrystalline perborate products are crystallized by cooling the intermediate solutions B. It is particularly desirable during this process to cool the solutions B obtained by the above reaction to temperatures of below about 25° C., preferably below about 20° C., possibly to as low as about 0° C. If necessary, microcrystallization can be supported by other known crystallization promoting measures, e.g. increasing the rate of nucleus formation by the action of ultrasonics.

In one advantageous embodiment of the process according to the invention, the composition A used contains hydrogen peroxide in a quantity such that the molar ratio of active oxygen to boron is 0.8:1 to 1.2:1. Preferably, hydrogen peroxide is contained in composition A in a quantity such that the molar ratio of active oxygen to boron is 0.9:1 to 1.1:1.

An advantageous sub-variant of the process according to the invention is characterized by the fact that composition A contains a quantity of alkali metal such that the molar ratio of alkali metal to boron is from 0.33:1 to 0.70:1. Molar ratios of alkali metal to boron from 0.55:1 to 0.67:1 are particularly preferred.

Another advantageous sub-variant of the process according to the invention is characterized by the fact that the amounts of alkali metal compound and composition A which are used are such that the molar ratio of alkali metal to boron in solution B is 0.80:1 to 1:1. It is particularly preferred to use amounts of alkali metal compound and composition A such that the molar ratio of alkali metal to boron in solution B is 0.9:1 to 1:1.

In particularly preferred sub-variants of the process according to the invention, the liquid aqueous composition A contains sodium as the alkali metal. In one embodiment of this sub-variant, a storage stable, highly concentrated aqueous solution is used as composition A, which solution contains amounts of boron-oxygen compound, hydrogen peroxide and sodium hydroxide such that the boron content is 3 to 8% by wt. based on the total solution, the molar ratio of sodium originating from the sodium hydroxide and possibly the boron-oxygen compound to boron is 0.55:1 to 0.70:1, and the molar ratio of active oxygen to boron is at least 0.9:1. In a further embodiment of this sub-variant, the composition A is prepared by diluting a highly concentrated, storage stable aqueous solution which contains quantities of boron-oxygen compound, hydrogen peroxide and sodium hydroxide such that the boron content is 3 to 8% by wt. based on the total solution, the molar ratio of sodium originating from the sodium hydroxide and possibly the boron-oxygen compound to boron is 0.55:1 to 0.70:1, and the molar ratio of active oxygen to boron is at least 0.9:1. A group of preferred storage stable, highly concentrated aqueous solutions for the aforementioned embodiments has a boron content of 6 to 7.5% by wt. A further group of particularly preferred storage stable, highly concentrated aqueous solutions have a molar ratio of sodium to boron from 0.60:1 to 0.67:1.

In a sub-variant of the process according to the invention, the liquid aqueous compositions A, which contain sodium hydroxide as the alkali metal hydroxide, are reacted with a basic inorganic sodium compound. The reaction preferably is carried out with sodium hydroxide, and a microcrystalline sodium perborate product is obtained. If the basic inorganic alkali metal compound used is not a sodium compound, then mixed alkali metal perborate products are obtained.

According to the process of the invention, microcrystalline perborate tetrahydrate products are obtained in particular, preferably microcrystalline sodium perborate tetrahydrate with especially fine perborate particles having particle diameters of not more than 10 micrometers. These products are also a part of the invention. Preferably, microcrystalline sodium perborate tetrahydrate products having particle diameters not more than 5 micrometers, particularly preferably not more than 3 micrometers, are obtained.

The actual execution of the process can be adapted depending on the intended use and can take place, in theory, in any aqueous media. In the simplest case, which illustrates the basic principle of the process in more detail, the preparation of the microcrystalline perborate particles takes place with water as the only solvent.

In this case, the aqueous composition A, and the basic alkali metal compound present in solid form or in the form of an aqueous solution are mixed as rapidly as possible with intensive stirring in quantities matched such that a molar ratio of alkali metal to boron of at least 0.80:1 is produced in the resulting solution B. Depending on the type and form of starting materials which are selected, this reaction can be carried out at temperatures up to about 100° C., preferably at moderately elevated temperatures of up to about 60° C.

In accordance with the process of the invention, it also is possible to use suspensions of composition A or, in the case of the basic inorganic alkali metal compound used to increase the alkali metal/boron molar ratio, also solid starting materials which change to a clear solution B on an intermediate basis only during the reaction. In preferred embodiments of the invention, however, the aqueous composition A which is used is already a solution which is reacted with basic inorganic alkali metal compounds which, in turn, are already in the form of an aqueous solution. In very preferred embodiments of the invention, a concentrated solution of the basic inorganic alkali metal compounds is reacted with an aqueous solution of composition A. Advantageous solutions of the basic inorganic alkali metal compounds are the alkali metal solutions which can be obtained by dissolving solid alkali metal hydroxides and/or oxides in water, for example sodium hydroxide solution.

In another very advantageous application cf the process of the invention, particularly with respect to the use of the microcrystalline perborate hydrate particles in aqueous liquid detergents, other components can also be present during crystallization, for example conventional water-miscible solvents such as lower alcohols (e.g. ethanol, n-propanol or isopropanol), surfactants, builders, auxiliaries and additives etc. for aqueous liquid detergents. The process according to the invention for preparing an aqueous suspension containing the microcrystalline perborate product and one or more other conventional liquid detergent constituents (not yet mentioned in the process description given further above) selected from the group consisting of surfactants, builders and water-miscible solvents, further comprises before process stage a) the step of mixing at least one of the aforementioned conventional liquid detergent constituents with composition A or with the basic inorganic alkali metal compound in aqueous solution. Preferably, the conventional liquid detergent constituent which is added is a surfactant.

During the preparation of such mixtures before process stage a), it is advantageous to match the quantities of all the constituents desired in the final aqueous liquid detergent formulation with each other and with the total mixture in such a way that, after carrying out the process for preparing the microcrystalline perborate hydrate particles, the finished overall formulation of the aqueous liquid detergent is already obtained, or only minor measures, such as the addition of small quantities of other additives, are required in order to formulate the liquid detergent. Even in this application of the process of the invention, a very fine, microcrystalline perborate hydrate product having particle diameters of not more than 10 micrometers is obtained as a result of process stage b), i.e. by cooling. Preferably particles having particle diameters of ≦5 micrometers, particularly preferably ≦3 micrometers, are obtained. Preferably, microcrystalline sodium perborate tetrahydrate particles are prepared in this application of the process of the invention.

The process of the invention is suitable for all applications for which very fine crystals of active oxygen-containing compounds are necessary or desirable. Highly advantageous possible applications include not only the bleaching agent and disinfectant fields, but also the detergent field as has already been mentioned. In this regard, the process of the invention is suitable for preparing perborate hydrate particles in the form of fine crystals either for aqueous or for non-aqueous liquid detergent formulations and, optionally, also for directly producing active oxygen-containing bleaching agents in the form of fine crystals in aqueous liquid detergent formulations. The liquid detergents in which the microcrystalline perborate hydrate particles produced according to the process of the invention are incorporated are very stable suspensions which, because of the small particle diameter in the region of 0.5 to 5 micrometers which can be achieved, show little, if any, sedimentation of the particles. Therefore, even after storage for a relatively long period, these liquid detergents with suspended perborate particles according to the invention need be shaken only slightly, if at all, before use.

The surprising advantages of the process according to the invention and of the perborate hydrate particles according to the invention, particularly the sodium perborate tetrahydrate particles which were prepared in connection with aqueous liquid detergents containing perborate, can be utilized in a comparable way not only on in the detergent field, but also in other fields of use in which very fine particles of active oxygen-containing compounds in liquid compositions are desired. Examples of other possible fields of use include bleaching agents and disinfectant compositions and in wood protection.

The success of the process according to the invention is believed to be essentially due to the fact that, either during the reaction in process stage a) the reaction mixture passes through a region of high solubility for the peroxy boron intermediate compound formed from the boron-oxygen compound in the presence of hydrogen peroxide and alkali metal, or the starting compositions A are solutions which by their nature already contain high dissolved concentrations of peroxy boron compound formed from the boron-oxygen compound in the presence of hydrogen peroxide and alkali metal. The alkali metal may originate entirely from the alkali metal hydroxide, or it may originate partly from the alkali metal hydroxide and partly from the boron-oxygen compound. It is preferably sodium. An unusually high solubility for the boron compounds present is found in particular in the case of compositions A in which the quantities of boron-oxygen compound, hydrogen peroxide and sodium hydroxide present therein are matched in such a way that the molar ratio of sodium to boron of 0.33:1 to 0.70:1 is used in composition A. Advantageously, the starting composition contains hydrogen peroxide in an amount such that the solution has a molar ratio of active oxygen to boron in the range from 0.8:1 to 1.2:1. Ratios of active oxygen to boron in the range from 0.9:1 to 1.1:1 are preferred. The concentration of dissolved boron that can be achieved in these compositions substantially exceeds that possible in solutions which are free of active oxygen. At a value of 1 to 4.5% by wt boron in the process according to the invention, it is many times higher than the maximum boron concentration attainable by dissolving sodium perborate tetrahydrate in water. Sodium perborate tetrahydrate has a maximum solubility in water at 15° C. of 25.5 g/l, which equals at most only approx. 0.8% by wt. boron. In view of the high dissolved concentrations of boron in the process of the invention, crystallization in process stage b) is associated with very high rates of nucleus formation, and therefore yields microcrystalline perborate hydrate products according to the invention.

Without being bound by a particular theory, it appears that polyperoxyborates, particularly sodium polyperoxyborates, which have a structural form particularly suitable for the process of the invention, are either already present in the composition A solutions, or are formed, at least intermediately, during the reaction in process stage a). On one hand, the sodium polyperoxyborates which are present in solution appear particularly to have a structure which solvates extremely well in an aqueous medium, thereby facilitating very high dissolved concentrations with no tendency to crystallize prematurely. On the other hand, these sodium polyperoxyborates, which apparently are present or form on an intermediate basis, can be converted very easily to sodium perborate tetrahydrate which is only slightly soluble in the aqueous medium (solubility in water at 15° C. approximately 25 g/l).

Moreover, the sodium polyperoxyborates also appear to have a chemically stable active oxygen content in aqueous solution. In particular, aqueous solutions fitting the definition of composition A, which have very high dissolved boron concentrations, exhibit a very favorable AVOX stability. They also can be stored for relatively long periods of time without any substantial active oxygen losses. Such solutions are described in more detail hereinafter as a further aspect of the invention.

The invention therefore also relates to storage stable, highly concentrated aqueous solutions containing a boronoxygen compound, hydrogen peroxide and sodium hydroxide, which are characterized by a boron content of from 3 to 8% by wt. based on the total solution, a molar ratio of sodium to boron in the range from 0.55:1 to 0.70:1, and a molar ratio of active oxygen to boron of at least 0.9:1. The sodium may originate entirely from the sodium hydroxide, or it may originate in part from the sodium hydroxide and in part from the boron-oxygen compound. Storage stable solutions are preferred which have a dissolved boron content of from 6 to 7.5% by wt.

These highly concentrated, storage stable aqueous solutions according to the invention are clear solutions at conventional ambient temperatures (e.g. in the temperature range of 10° to 25° C.) which contain an active oxygen-containing sodium boron compound, presumably having a sodium polyperoxyborate structure, formed from the constituents boron-oxygen compound, hydrogen peroxide, water and sodium, in a quantity which corresponds to a dissolved quantity of more than about 500 g/l sodium perborate tetrahydrate. Preferred solutions which are storage stable have a boron content of 6 to 7.5% by wt. and contain these sodium polyperoxyborates in clear solution, even in a quantity which corresponds to more than about 1200 g/l sodium perborate tetrahydrate and yet exhibit no tendency to crystallize prematurely. Important commercial perborates such as sodium perborate tetrahydrate or sodium perborate monohydrate have, on the other hand, substantially lower solubilities in water or aqueous media. For example, the solubility of sodium perborate tetrahydrate in water at 15° C. is only 25.5 g/l and at 35° C. is only 36 g/l. The solubility of sodium perborate monohydrate corresponds, in principle, to that of the tetrahydrate because the monohydrate is converted in the presence of water to the tetrahydrate.

Advantageously, a molar ratio of active oxygen to boron in the range from 0.9:1 to 1.1:1 should be present in storage stable solutions according to the invention which are to be used in the process described above for preparing microcrystalline perborate hydrate products. However, if desired, much higher molar ratios of active oxygen to boron can be present in advantageous storage stable solutions according to the invention which are intended for other uses, e.g. for use as bleaching agent solutions or as disinfectant solutions or for use in pulp bleaching or in the wood protection sector. Preferred storage stable solutions for these uses have, for example, $O_2$:B molar ratios of 1:1 to 2:1.

Preferred embodiments of the storage stable solutions according to the invention have densities from 1.2 to 1.6 g/l. In particular, solutions which have densities in the range from 1.4 to 1.5 g/l are highly preferred. The pH values of such solutions are between 4 and 7; pH values of between 5 and 6 being preferred.

With the storage stable solutions according to the invention, it is possible in an advantageous manner to make sodium peroxy boron compounds available as concentrated, particularly highly concentrated, aqueous solutions for various applications. The solutions according to the invention have a greater stability under customary storage conditions (approximately 20° C.), particularly in comparison with aqueous solutions which contain conventional perborates (sodium perborate monohydrate or tetrahydrate). For example, after being stored for a period of approximately four weeks, the solutions according to the invention still have least 95% of their original active oxygen content, and preferred solutions according to the invention still have at least 98% of their original active oxygen content. Under customary storage conditions, the solutions according to the invention are storage stable for at least three months. That is to say, they exhibit no crystallization during this period and still have high active oxygen contents afterward.

Storage stable solutions according to the invention can be prepared in a simple manner by mixing an aqueous starting material solution or suspension containing a boron-oxygen compound and sodium hydroxide, with hydrogen peroxide or a starting material for in situ formation of hydrogen peroxide, and allowing the resulting mixture to react, optionally at elevated temperature. If desired, water may first be added to the initial aqueous solution of suspension to adjust to a desired concentration. The starting materials are added to the reaction mixture in proportions such that, on the one hand, the mixture has a molar ratio of sodium to boron of 0.55 to 0.70:1, and on the other hand, the molar ratio of active oxygen to boron is at least 0.9:1, preferably 1:1 to 2:1. Although it is advantageous to allow the starting compounds to react immediately while maintaining the above-mentioned molar ratios, it is also possible to commence the reaction with different molar ratios and to adjust the reaction mixture to the stated molar ratios gradually during the reaction. The quantities of starting materials to be used are advantageously initially selected such that the sodium polyperoxyborate compound which forms is present in the resulting storage stable solutions in a concentration which corresponds to a boron content of from 3 to 8% by wt. The boron content is preferably in the range from 6 to 7.5% by wt.

All customary sources of boron, sodium and active oxygen used for preparing perborates are suitable as starting materials. Suitable sources of boron include, for example, boric acid, boron oxide ($B_2O_3$), borax (e.g. borax decahydrate or borax pentahydrate), metaborate, boron minerals etc. Hydrogen peroxide solution (e.g. 30 to 85% by wt.) or sodium peroxide are, for example, suitable as sources of active oxygen. Sodium hydroxide as such or sodium hydroxide formed in situ from sodium oxide in the aqueous medium can be used, for example, as a source of sodium. If desired such sodium sources may be supplemented. Moreover, it is also possible to use, for example, orthoborate solutions, but in such a case a boron compound such as boric acid or boron oxide must be added, and possibly also an inorganic acid such as sulfuric acid or phosphoric acid.

In advantageous embodiments of the invention, conventional stabilizers for peroxide compounds may be added to the storage stable solutions according to the invention or introduced in the desired quantity during the preparation of these solutions. Phosphates such as metaphosphate, organic stabilizers such as quinolinic acid, salicylic acid or dipicolinic acid (DPA), chelating agents such as 8-hydroxyquinoline or ethylenediamine tetraacetic acid (EDTA), phosphonic acid derivatives such as methylene or aminomethylene phosphonic acids or salts thereof, and also small quantities of conventional wetting agents are suitable as stabilizers, for example. Particularly suitable stabilizers, especially with respect to the long term stability of the solutions according to the invention, include, for example, 1-hydroxyethane-1,1-diphosphonic acid, ethylene diamine tetraphosphonic acid, diethylene triamine pentamethylene phosphonic acid and salts thereof, particularly sodium salts thereof. Such stabilizers can be present in the storage stable solutions in conventional concentrations of from 0.1 to 10 g/kg. If the stabilizers are introduced during preparation of the solutions according to the invention, this may advantageously be accomplished via the hydrogen peroxide solution which is used. It is particularly desirable to use the stabilizers in the same quantities that are also intended to be present later in the product solutions.

Insofar as the sodium peroxy boron compounds, which are contained in the storage stable solutions of the invention after the reactions for preparing the solutions are completed, are already present in a concentration suitable for the intended use, the solutions obtained can be used directly for such uses, optionally after addition of further stabilizers. It is, or course, also possible to obtain solutions having other desired concentrations by removing or adding water.

The storage stable solutions according to the invention can be used in a large number of ways. On the one hand, the solutions can be introduced directly into formulations which are intended to contain an active oxygen-containing bleaching agent, e.g. into aqueous liquid detergent formulations or disinfectants, formulations for pulp bleaching, or wood protection formulations. On the other hand, the storage stable solutions according to the invention are highly suitable (e.g. in the process according to the invention described above) for preparing microcrystalline sodium perborate tetrahydrate having particle diameters of at most 5 micrometers, preferably not more than 3 micrometers. Moreover, the storage stable solutions can also be used to prepare solid sodium peroxy boron compounds by conventional drying processes such as spray drying, spray granulation, or roller drying. The conventional process parameters for the particular process can be used. It has proved to be advantageous that, as a result of the high concentration of sodium peroxy boron compound in the storage stable solutions according to the invention, only comparatively small proportions of water need to be evaporated to obtain solid products.

The process and products according to the invention (storage stable solutions, suspensions, pastes, dry particles) offer a surprising and trouble-free solution to the frequent need to prepare active oxygen-containing bleaching agents for many applications, particularly for aqueous liquid detergent formulations. The process according to the invention and the products of the invention make it possible to introduce a substantial peroxide bleaching agent content in an advantageous manner into liquid formulations, especially aqueous liquid formulations for washing, disinfecting and bleaching purposes, as well as other applications. As a result of the invention, it is possible to solve problems which could not be solved in the prior art, for example, in the formulation of liquid, particularly aqueous liquid, washing agents containing active oxygen-containing bleaching agents, in the field of disinfectants, bleaching agents etc. The products according to the invention are highly compatible with basically all the conventional constituents of such formulations, particularly, e.g. with surfactants, builders, customary auxiliaries e.g. complexing and chelating agents, soap foam regulators and other possible conventional additives.

It is a particularly advantageous feature of the solutions of the invention that the active oxygen is contained in a surprisingly firmly combined form, as impressively illustrated by the high degree of chemical stability (AVOX stability) over relatively long storage periods. On the other hand, the active oxygen is readily liberated after dilution of the solutions according to the invention with warer to concentrations appropriate for the desired uses and can develop the effect needed for such uses. This is surprising because it was not possible in the prior art to prepare comparable stable aqueous and active oxygen-containing solutions with conventional perborates. On the one hand, the high concentrations of dissolved sodium peroxy boron compound (expressed in % by wt.. boron) could not be achieved in the prior art. On the other hand, conventional perborate solutions decompose readily even at ambient temperature and are subject to undesired active oxygen losses during storage. In contrast, the solutions according to the invention have excellent active oxygen stability and provide a high degree of storage stability, particularly over commercial periods of time.

Although the sodium peroxy boron compound content of the solutions according to the invention far exceeds the solubility of conventional perborates (Na:B=1:1), the concentrated solutions are nevertheless also physically stable during storage and do not exhibit any tendency to undesired crystallization. Consequently, the compositions can be preformulated and stored without any problems. As a result of this storage stability, a high degree of flexibility in terms of preparation, storage, transport and processing of these solutions is assured.

The process of the invention makes it possible to obtain high concentrations of dissolved peroxy boron compounds as a preliminary stage in the preparation of microcrystallized perborate hydrates, particularly PBS4. This assures that in the crystallization of perborate hydrates, a very large number of condensation nuclei can be formed substantially simultaneously, which in turn leads to the desired perborate hydrate particles in the form of very fine crystals.

In contrast to the prior art process described at the beginning, the risk of secondary reactions between oxidizable organic compounds (e.g. surfactant) and hydrogen peroxide can be avoided because it is not necessary in the process of the invention to have a surfactant and/or builder present during the reaction of the boron-oxygen compound with hydrogen peroxide in order to prepare microcrystalline perborate hydrates.

The invention will be described in further detail by the following examples which serve to illustrate the invention without limiting its scope.

EXAMPLE 1

Initially, 598 grams solid sodium hydroxide and subsequently 1.4 kg boric acid ($H_3BO_3$) were added to 500 ml water, the temperature rising to 90° to 100° C. as a result of the heat of reaction. After the addition of 1.42 kg of a 70% by wt. hydrogen peroxide solution and 48 g of a solution of ethylene diamine tetramethylene phosphonic acid pentasodium salt (25% by wt active acid in aqueous solution), the resulting clear solution Was cooled to ambient temperature. The clear product solution was characterized by the following properties:

| | |
|---|---|
| Active oxygen content: | 12.7% by wt |
| Boron content: | 6.6% by wt |
| Na:B molar ratio: | 0.61:1 |
| $O_2$:B molar ratio: | 1.28:1 |
| Density: | 1.42 g/l |
| pH: | 5.2 |

EXAMPLE 2

11 kg of a solution of ethylene diamine tetramethylene phosphonic acid pentasodium salt (25% by wt active acid in aqueous solution) were added to 386 l of a 70% by wt. hydrogen peroxide solution, and 975 kg borax decahydrate ($Na_2B_4O_7.10\ H_2O$) were subsequently introduced to form a suspension therein. After the addition of 86.5 kg of a 50% by wt. sodium hydroxide solution, the mixture was allowed to react for a further 30 minutes. A clear solution with the following properties was obtained:

| | |
|---|---|
| Active oxygen content: | 10.8% by wt |
| Boron content: | 7.1% by wt |
| Na:B molar ratio: | 0.6:1 |
| $O_2$:B molar ratio: | 1:1 |
| Density: | 1.47 g/l |
| pH: | 5.7 |

EXAMPLE 3

Initially, 15 kg of an aqueous solution of ethylene diamine tetramethylene phosphonic acid pentasodium salt (25% by wt. active acid in aqueous solution) were added to 477 l of a 50% by wt. hydrogen peroxide solution, and 600 kg borax pentahydrate ($Na_2B_4O_7.5\ H_2O$) were subsequently added to the resulting stabilized hydrogen peroxide solution to form a suspension. After the addition of 66 kg of a 50% by wt. sodium hydroxide solution, a reaction mixture at a temperature of 40° C. was obtained. After a reaction time of 30 minutes, a clear solution having the following properties was obtained as product:

| AVOX content: | 10.7% by wt |
|---|---|
| Boron content: | 7.3% by wt |
| Na:B molar ratio: | 0.6:1 |
| $O_2$:B molar ratio: | 1.01:1 |
| Density: | 1.47 g/l |
| pH: | 5.6 |

EXAMPLE 4

Initially, 11 kg of an aqueous solution of diethylene triamine pentamethylene phosphonic acid pentasodium salt (25% by wt active acid in aqueous solution) were added to 477 l of a 50% by wt. hydrogen peroxide solution, and 600 kg borax pentahydrate ($Na_2B_4O_7.5$ $H_2O$) were subsequently added to the resulting stabilized hydrogen peroxide solution to form a suspension. After the addition of 66 kg of a 50% by wt sodium hydroxide solution, a reaction mixture at a temperature of 40° C. was obtained. After a reaction time of 30 minutes, a clear solution having the following properties was obtained as product:

| AVOX content: | 10.5% by wt |
|---|---|
| Boron content: | 7.2% by wt |
| Na:B molar ratio: | 0.6:1 |
| $O_2$:B molar ratio: | 0.99:1 |

EXAMPLE 5

In order to determine the storage stability of the active oxygen content of the solutions prepared in Examples 1 to 3, they were stored for 30 days, and the solution prepared in Example 4 was stored for 35 days, at 20° C. In another test each of the solutions was kept for 20 minutes at 90° C. The active oxygen content of the solutions before and after storage was analyzed by known titrimetric methods in order to determine the active oxygen loss brought about by decomposition during storage. The results are summarized in the following Table 1:

TABLE 1

| Solution from Example no. | % active oxygen loss 30 days/20° C. | % active oxygen loss 20 mins/90° C. |
|---|---|---|
| 1 | 1.6 | 2.6 |
| 2 | 4.2 | 4.5 |
| 3 | 3.9 | 4.7 |
| 4 | 3.2 | 4.3 |

EXAMPLE 6

100 grams of the solution prepared in Example 3 were diluted with 140 grams water to form a solution with a boron concentration of 3% by wt. Subsequently, 21.56 grams of a 50% by wt. sodium hydroxide solution were added at a temperature of 60° C., and the resulting clear reaction solution was cooled to a temperature of 5° to 10° C. in order to initiate crystallization. Crystallization ended after 20 minutes. A suspension of microcrystalline sodium perborate tetrahydrate particles was obtained in a form which was already suitable for use.

EXAMPLE 7

The sodium perborate tetrahydrate particles from the suspension obtained in Example 6 were separated by centrifuging and filtering, and any residual moisture still adhering was removed by drying at 40° C. in a drying cabinet. The water of crystallization remained essentially in the product during the drying process. The following analytical results were obtained for the microcrystalline sodium perborate tetrahydrate particles:

| Active oxygen content: | 10.81% by wt |
|---|---|
| Boron content: | 7.34% by wt |
| Sodium content: | 15.51% by wt |
| $H_2O$ content (water of crystallization): | 32.4% by wt |
| Na:B molar ratio: | 0.99:1 |
| $O_2$:B molar ratio: | 0.99:1 |
| Particle diameter*: | <5 micrometers |

*determined from scanning electron microscope photographs.

The foregoing analytical results confirm that essentially a microcrystalline sodium perborate tetrahydrate having a particle diameter of less than 5 micrometers is present in the prepared suspension of microcrystalline perborate hydrate particles of Example 6.

EXAMPLE 8

The solution prepared in Example 3 was diluted initially with water to form a solution with a boron concentration of 2% by wt. Subsequently, 6.1 g of a 50% by wt sodium hydroxide solution were added to the 2% by wt boron solution at a temperature of 60° C. The resulting clear reaction solution was cooled to a temperature of 5° to 10° C. in order to initiate crystallization. After 20 minutes, crystallization had ended. A suspension of crystalline sodium perborate tetrahydrate particles was obtained in a form which was already suitable for use.

EXAMPLE 9

The sodium perborate tetrahydrate particles were separated from the suspension obtained in example 8 by centrifuging and filtering, and any residual moisture still adhering was removed by drying at 40° C. in a drying cabinet. The water of crystallization remained essentially in the product during the drying process. The following analytical results were obtained for the microcrystalline sodium perborate tetrahydrate particles:

| Active oxygen content: | 10.67% by wt |
|---|---|
| Boron content: | 7.3% by wt |
| Sodium content: | 14.9% by wt |
| $H_2O$ content (water of crystallization): | 34.4% by wt |
| Na:B molar ratio: | 0.96:1 |
| $O_2$:B molar ratio: | 0.99:1 |
| Particle diameter*: | <3 micrometers |

*determined from scanning electron microscope photographs.

The foregoing analytical results confirm that essentially a microcrystalline sodium perborate tetrahydrate having a particle diameter of <3 micrometers is present in the prepared suspension of microcrystalline perborate hydrate particles of Example 8.

EXAMPLE 10

The solution prepared in Example 3 was diluted initially with water to form a solution having a boron concentration of 4% by wt. 12.21 g of a 50% by wt sodium hydroxide solution were subsequently added to 100 grams of the 4% by wt. boron solution at a temperature of 60° C. The resulting clear reaction solution was cooled to a temperature of 5° to 10° C. in order to initiate crystallization. After 20 minutes, crystallization had ended. A paste composed of microcrystalline sodium perborate hydrate particles was obtained in a form which was already suitable for use. The paste had an active oxygen content of 5.4% by wt and particle sizes of <5 micrometers.

EXAMPLE 11

Any residual moisture still adhering was removed from the paste of sodium perborate hydrate particles obtained in Example 10 by drying at 40° C. in a drying cabinet. The following analytical results were obtained for the microcrystalline sodium perborate hydrate particles:

| | |
|---|---|
| Active oxygen content: | 11.1% by wt |
| Boron content: | 7.7% by wt |
| Sodium content: | 15.0% by wt |
| $H_2O$ content (water of crystallization): | 28.2% by wt |
| Na:B molar ratio: | 0.96:1 |
| $O_2$:B molar ratio: | 0.97:1 |
| Particle diameter*: | <5 micrometers |

*determined from scanning electron microscope photographs.

The foregoing analytical results confirm that essentially microcrystalline perborate hydrate particles having a particle diameter of less than 5 micrometers are present in the prepared paste of Example 10.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A process for preparing microcrystalline perborate products, comprising the steps of:
   a) reacting a liquid aqueous composition A, which contains an inorganic boron-oxygen compound, hydrogen peroxide and a quantity of an alkali metal hydroxide such that the molar ratio of alkali metal to boron is at most 0.75:1, with a basic inorganic alkali metal compound to form a solution B, wherein said basic inorganic alkali metal compound and said composition A are used in such quantities that the molar ratio of alkali metal to boron in said solution B is at least 0.80:1 and the boron concentration in said solution B is 1 to 4.5% by wt. based on the weight of the solution, and
   b) cooling the resulting solution B and crystallizing a perborate product.

2. A process according to claim 1, wherein said composition containing inorganic boron-oxygen compound is a solution of inorganic boron-oxygen compound in water.

3. A process according to claim 1, wherein said composition containing inorganic boron-oxygen compound is a suspension of inorganic boron-oxygen compound in water.

4. A process according to claim 1, wherein the alkali metal content of said composition A all originates from said alkali metal hydroxide.

5. A process according to claim 1, wherein the alkali metal content of said composition A originates in part from said alkali metal hydroxide and in part from said boron compound.

6. A process according to claim 1, wherein said basic inorganic alkali metal compound is in solid form.

7. A process according to claim 1, wherein said basic inorganic alkali metal compound is in the form of an aqueous solution.

8. A process according to claim 1, wherein said basic inorganic alkali metal compound is an alkali metal hydroxide.

9. A process according to claim 1, further comprising prior to step a) the step of mixing at least one liquid detergent constituent selected from the group consisting of surfactants, builders and water-miscible solvents with said liquid aqueous composition A or with a solution of said basic inorganic alkali metal compound, whereby an aqueous suspension containing a microcrystalline perborate product and said at least one liquid detergent constituent is obtained.

10. A process according to claim 9, wherein said liquid detergent constituent is a surfactant.

11. A process according to claim 1, wherein said aqueous liquid composition A contains hydrogen peroxide in a quantity such that the molar ratio of active oxygen to boron is 0.8:1 to 1.2:1.

12. A process according to claim 11, wherein the molar ratio of active oxygen to boron in said aqueous liquid composition A is 0.9:1 to 1.1:1.

13. A process according to claim 1, wherein said aqueous liquid composition A has a molar ratio of alkali metal to boron from 0.33:1 to 0.70:1.

14. A process according to claim 13, wherein the molar ratio of alkali metal to boron in said aqueous liquid composition A is 0.55:1 to 0.67:1.

15. A process according to claim 1, wherein said aqueous liquid composition A and said basic inorganic alkali metal compound are used in quantities such that the resulting solution B has a molar ratio of alkali metal to boron in the range from 0.80:1 to 1:1.

16. A process according to claim 15, wherein the molar ratio of alkali metal to boron in said solution B is from 0.90:1 to 1:1.

17. A process according to claim 1, wherein the alkali metal in said liquid aqueous composition A is sodium.

18. A process according to claim 17, wherein said aqueous liquid composition A is a storage stable, aqueous solution which contains quantities of inorganic boron-oxygen compound, hydrogen peroxide and sodium hydroxide such that said composition A has a boron content of from 3 to 8% by wt. based on the total weight of the solution, a molar ratio of sodium to boron of from 0.55:1 to 0.70:1, and a molar ratio of active oxygen to boron of at least 0.9:1.

19. A process according to claim 18, wherein said composition A is prepared by diluting storage stable, aqueous solution containing quantities of inorganic boron-oxygen compound, hydrogen peroxide, and sodium hydroxide such that said solution has a boron content of from 3 to 8% by wt. based on the total weight of the solution, a molar ratio of sodium to boron of from 0.55:1 to 0.70:1, and a molar ratio of active oxygen to boron of at least 0.9:1.

20. A process according to claim 19, wherein said storage stable, aqueous solution has a boron content in the range from 6 to 7.5% by wt.

21. A process according to claim 18, wherein said storage stable, aqueous solution has a boron content in the range from 6 to 7.5% by wt.

22. A process according to claim 18, wherein said storage stable, aqueous solution has a molar ratio of sodium to boron in the range from 0.60:1 to 0.67:1.

23. A process according to claim 18, wherein said storage stable, aqueous solution has a molar ratio of active oxygen to boron in the range from 0.9:1 to 1.2:1.

24. A process according to claim 23, wherein said storage stable, aqueous solution has a molar ratio of active oxygen to boron in the range from 0.9:1 to 1.1:1.

25. A process according to claim 17, wherein the liquid aqueous composition A is reacted with a basic inorganic sodium compound.

26. A process according to claim 1, wherein said perborate product is a microcrystalline perborate tetrahydrate.

27. A microcrystalline perborate product prepared by the process of claim 1.

28. A microcrystalline perborate product according to claim 27, wherein said product has a particle diameter of at most 5 micrometers.

29. A microcrystalline perborate product according to claim 28, wherein said product has a particle diameter of at most 3 micrometers.

30. A microcrystalline perborate product according to claim 27, wherein said product is a sodium perborate tetrahydrate.

31. A storage stable, aqueous solution containing quantities of inorganic boron-oxygen compound, hydrogen peroxide and sodium hydroxide such that the boron content of said solution is 3 to 8% by wt based on the total weight of the solution, the molar ratio of sodium to boron is from 0.55:1 to 0.70:1, and the molar ratio of active oxygen to boron is at least 0.9:1.

32. A solution according to claim 31, wherein the sodium content of said solution all originates from said sodium hydroxide.

33. A solution according to claim 31, wherein the sodium content of said solution originates in part from said sodium hydroxide and in part from said boron compound.

34. A solution according to claim 31, wherein the boron content is in the range from 6 to 7.5% by wt.

35. A solution according to claim 31, wherein the molar ratio of sodium to boron is in the range from 0.60:1 to 0.67:1.

36. A solution according to claim 31, wherein the molar ratio of active oxygen to boron is in the range from 1:1 to 2:1.

37. A solution according to claim 31, wherein said solution has a density in the range from 1.2 to 1.6 g/l.

38. A solution according to claim 37, wherein said solution has a density in the range from 1.4 to 1.5 g/l.

39. A solution according to claim 31, wherein said solution has a pH in the range from 4 to 7.

40. A solution according to claim 39, wherein said solution has a pH in the range from 5 to 6.

* * * * *